United States Patent
Kamyshanska et al.

(10) Patent No.: US 11,282,214 B2
(45) Date of Patent: Mar. 22, 2022

(54) MOTION MATCHING ANALYSIS

(71) Applicant: AGT INTERNATIONAL GMBH, Zurich (CH)

(72) Inventors: Hanna Kamyshanska, Karben (DE); Christian Debes, Muhltal (DE); Ivan Tankoyeu, Darmstadt (DE); Thomas Bader, Pfungstadt (DE)

(73) Assignee: AGT INTERNATIONAL GMBH, Zurich (CH)

(*) Notice: Subject to any disclaimer, the term of this patent is extended or adjusted under 35 U.S.C. 154(b) by 38 days.

(21) Appl. No.: 16/737,476

(22) Filed: Jan. 8, 2020

(65) Prior Publication Data
US 2021/0209770 A1 Jul. 8, 2021

(51) Int. Cl.
*G06T 7/246* (2017.01)
*G06T 7/73* (2017.01)
(Continued)

(52) U.S. Cl.
CPC ............. *G06T 7/248* (2017.01); *G06T 7/285* (2017.01); *G06T 7/74* (2017.01); *G06V 10/757* (2022.01);
(Continued)

(58) Field of Classification Search
CPC .......... G06K 9/00335; G06K 9/00342; G06K 9/00345; G06K 9/00355; G06K 9/00758;
(Continued)

(56) References Cited

U.S. PATENT DOCUMENTS 9,981,193 B2    5/2018 Adams et al.
2010/0303289 A1* 12/2010 Polzin et al. ......... A63F 13/428
                                                            382/103
(Continued)

FOREIGN PATENT DOCUMENTS

CN    108615055 A    10/2018
CN    109376705 A    2/2019
(Continued)

OTHER PUBLICATIONS

Hartley, et al. Triangulation, Computer Vision and Image Understanding, Nov. 1997, pp. 146-157, vol. 68, No. 2.
(Continued)

*Primary Examiner* — Andrew W Johns
(74) *Attorney, Agent, or Firm* — Browdy and Neimark, PLLC

(57) ABSTRACT

A method which includes obtaining a first sequence of images of a user attempting to reproduce a sequence of poses of a reference user and determining correct performance of the user. For each body part of a plurality of body parts of the user, a spatial orientation of the body part in a referential independent of an orientation of any other body part of the user is compared to the spatial orientation of the reference user. If the comparison does not meet a matching criterion for at least one body part of the user, data representative of a mismatch between the orientation of the body part of the user and the spatial orientation of the reference user is output, thereby enabling the user to correct his pose using a feedback pointing to the body part to be corrected.

20 Claims, 9 Drawing Sheets

(51) Int. Cl.
*G06V 40/20* (2022.01)
*G06T 7/285* (2017.01)
*G06V 10/75* (2022.01)

(52) U.S. Cl.
CPC .... *G06V 40/23* (2022.01); *G06T 2207/10021* (2013.01); *G06T 2207/30244* (2013.01)

(58) Field of Classification Search
CPC ........... G06T 7/20; G06T 7/246; G06T 7/248; G06T 7/70; G06T 7/73; G06T 7/74; G06T 2207/30196; A63B 24/0003; A63B 24/0006; A63B 2024/0012; A63B 2024/0015; A63B 2214/00; A63B 2220/05; A63B 2230/62; G06V 20/48; G06V 40/20; G06V 40/23; G06V 40/25; G06V 40/28

See application file for complete search history.

(56) References Cited

U.S. PATENT DOCUMENTS

| 2012/0053015 | A1* | 3/2012 | Esaki et al. ............ | A63B 69/00 482/8 |
| 2015/0080183 | A1 | 3/2015 | Alessandri et al. | |
| 2015/0099252 | A1* | 4/2015 | Anderson et al. .... | G06T 7/0014 434/257 |
| 2015/0196803 | A1 | 7/2015 | Shavit et al. | |
| 2016/0232676 | A1* | 8/2016 | Baek et al. ......... | G06K 9/00342 |
| 2017/0266491 | A1 | 9/2017 | Rissanen et al. | |
| 2018/0015345 | A1 | 1/2018 | Wrigg | |
| 2019/0102950 | A1 | 4/2019 | Lu Hill et al. | |
| 2019/0362139 | A1* | 11/2019 | Mehl et al. ........... | A61B 5/1116 |
| 2020/0090408 | A1* | 3/2020 | Virkar et al. ........ | G06N 3/0454 |
| 2020/0126284 | A1* | 4/2020 | Garofalo et al. ....... | G06F 3/017 |
| 2020/0311395 | A1* | 10/2020 | Kim et al. ......... | G06K 9/00208 |
| 2021/0065452 | A1* | 3/2021 | Gazioglu ................ | G06T 11/00 |
| 2021/0216759 | A1* | 7/2021 | Asayama et al. ......... | G06T 7/70 |

FOREIGN PATENT DOCUMENTS

| JP | 2012-73935 | A | 4/2012 |
| JP | 2012-178036 | A | 9/2012 |
| JP | 5837860 | B2 | 12/2015 |
| KR | 2017-0104322 | A | 9/2017 |

OTHER PUBLICATIONS

Rao, et al., View-Invariance in Action Recognition, IEEE Computer Society Conference on Computer Vision and Pattern Recognition, Feb. 2001, pp. 1-8, Section 3.2.

Toshev, et al., DeepPose: Human Pose Estimation via Deep Neural Networks, Human pose estimation via deep neural networks. Proceedings of the IEEE Conference on Computer Vision and Pattern Recognition (CVPR), Columbus, Oh, USA. 2014.

* cited by examiner

MOTION MATCHING ANALYSIS

TECHNICAL FIELD

The presently disclosed subject matter relates, in general, to the field of analyzing a match between a motion of a user and a desired motion.

BACKGROUND

In many applications, there is a technical need to compare a motion of a user with respect to a desired motion. This need exists for example in fitness training, in which a user is requested to reproduce motion of a teacher, which can be displayed e.g. on screen.

Therefore, there is a need to provide improved systems and methods to characterize and provide a feedback regarding a match between motion of a user and a desired motion.

GENERAL DESCRIPTION

In accordance with certain aspects of the presently disclosed subject matter, there is provided a method comprising, by a processor and memory circuitry: obtaining a first sequence of images of a user, determining correct performance of at least one pose of the user in the first sequence of images, the determination including: based on at least one image of the first sequence of images, for each body part of a plurality of body parts of the user, comparing at least one of spatial orientation and position of the body part of the user, or of at least one body node thereof, with at least one of desired spatial orientation and position, if the comparison does not meet a matching criterion for at least one body part of the user, or of at least one body node thereof, outputting data representative of a mismatch between the at least one body part of the user, or of the at least one body node thereof, and the at least one of desired spatial orientation and position.

In addition to the above features, the method according to this aspect of the presently disclosed subject matter can optionally comprise one or more of features (i) to (xi) below, in any technically possible combination or permutation:

i. the method includes, based on a plurality of images of the first sequence of images, for at least one body part of a plurality of body parts of the user, comparing at least one of spatial orientation and position of the body part or of at least one body node thereof in each image of the plurality of images with at least one of desired spatial orientation and position, and based on the comparison, outputting data representative of correct performance of a motion of the user over the plurality of images;

ii. the method includes comparing, for a group of body parts, at least one of spatial orientation and position of each body part of the user belonging to the group, or of at least one body node thereof, with at least one of desired spatial orientation and position, and based on the comparison, outputting data representative of correct performance of a pose defined by the group of body parts;

iii. the at least one of desired spatial orientation and position is a spatial orientation and position of a corresponding body part, or of at least one body node thereof, of a reference user or of the user himself;

iv. responsive to determining of a mismatch between the at least one body part of the user, or of at least one body node thereof, and the at least one of desired spatial orientation and orientation, the method includes preventing from comparing at least one of spatial orientation and position of a given second body part of the user in the image, or of at least one body node thereof, with at least one of desired spatial orientation and position, wherein the given second body part is predefined with respect to the at least one body part;

v. the comparison is prevented until a stopping condition is met;

vi. the method includes providing a library including at least one of a list of desired configurations of one or more groups of body parts, wherein each configuration can be expressed by at least one semantic expression, a list of desired motions, wherein each desired motion can be expressed by at least one semantic expression, wherein the library is usable for at least one of providing instructions to the user, evaluating at least one of a configuration of a group of body parts and a motion of the user, and providing a semantic feedback to the user.

vii. the method includes (1) comparing at least one of spatial orientation and position of a body part of the user, or of at least one body node thereof, with at least one of desired spatial orientation and position, (2) if the comparison meets a matching criterion, repeating (1) for a next body part of the user, wherein the next body part is selected according to data representative of human body kinematics;

viii. data representative of human body kinematics includes a representation of at least one of body nodes and body parts, wherein the representation is hierarchical and representative of connectivity between the at least one body nodes and body parts in a human body;

ix. the method includes, if the comparison does not meet a matching criterion, preventing from comparing at least one of spatial orientation and position of a given next body part of the user in the image, or of at least one body node thereof, with at least one of desired spatial orientation and position, wherein the given next body part is selected based on the data representative of human body kinematics;

x. the method includes determining a pose of the user in each of one or more images of the first sequence of images, providing at least one of data representative of a time delay between a pose of the user in an image at a first time, and a desired pose expected at a second time, data representative of differences between an order of poses of the user and a desired order of poses; and data representative of differences between a plurality of poses of the user and a plurality of desired poses; and xi. the method includes normalizing position data representative of the body part or of a body node thereof of the user based on a height of the user.

According to another aspect of the presently disclosed subject matter there is provided a system including a processor and memory circuitry configured to obtain a first sequence of images of a user, determine correct performance of at least one pose of the user in the first sequence of images, the determination including: based on at least one image of the first sequence of images, for each body part of a plurality of body parts of the user, comparing at least one of spatial orientation and position of the body part of the user, or of at least one body node thereof, with at least one of desired spatial orientation and position, if the comparison does not meet a matching criterion for at least one body part of the user, or of at least one body node thereof, outputting data representative of a mismatch between the at least one body part of the user, or of the at least one body node thereof, and the desired spatial orientation and position.

In addition to the above features, the method according to this aspect of the presently disclosed subject matter can optionally comprise one or more of features (xii) to (xix) below, in any technically possible combination or permutation:

xii. the system is configured to, based on a plurality of images of the first sequence of images, for at least one body part of a plurality of body parts of the user, compare at least one of spatial orientation and position of the body part or of at least one body node thereof in each image of the plurality of images with at least one of desired spatial orientation and position, and based on the comparison, output data representative of correct performance of a motion of the user over the plurality of images;

xiii. the system is configured to compare, for a group of body parts, at least one of spatial orientation and position of each body part of the user belonging to the group, or of at least one body node thereof, with at least one of desired spatial orientation and position, and based on the comparison, output data representative of correct performance of a pose defined by the group of body parts;

xiv. responsive to determining of a mismatch between the at least one body part of the user, or of at least one body node thereof, and the at least one of desired spatial orientation and orientation, the system is configured to prevent from comparing at least one of spatial orientation and position of a given second body part of the user in the image, or of at least one body node thereof, with at least one of desired spatial orientation and position, wherein the given second body part is predefined with respect to the at least one body part;

xv. the system is configured to (1) compare at least one of spatial orientation and position of a body part of the user, or of at least one body node thereof, with at least one of desired spatial orientation and position, (2) if the comparison meets a matching criterion, repeat (1) for a next body part of the user, wherein the next body part is selected according to data representative of human body kinematics;

xvi. data representative of human body kinematics includes a representation of at least one of body nodes and body parts, wherein the representation is hierarchical and representative of connectivity between the at least one body nodes and body parts in a human body;

xvii. the system is configured to, if the comparison does not meet a matching criterion, prevent from comparing at least one of spatial orientation and position of a given next body part of the user in the image, or of at least one body node thereof, with at least one of desired spatial orientation and position, wherein the given next body part is selected based on the data representative of human body kinematics;

xviii. determine a pose of the user in each of one or more images of the first sequence of images; and xix. the system is configured to provide at least one of data representative of a time delay between a pose of the user in an image at a first time, and a desired pose expected at a second time, data representative of differences between an order of poses of the user and a desired order of poses, and data representative of differences between a plurality of poses of the user and a plurality of desired poses.

According to another aspect of the presently disclosed subject matter there is provided a non-transitory computer readable medium comprising instructions that, when executed by a processor and memory circuitry (PMC), cause the PMC to perform operations comprising obtaining a first sequence of images of a user, determining correct performance of at least one pose of the user in the first sequence of images, the determination including: based on at least one image of the first sequence of images, for each body part of a plurality of body parts of the user, comparing at least one of spatial orientation and position of the body part of the user, or of at least one body node thereof, with at least one of desired spatial orientation and position, if the comparison does not meet a matching criterion for at least one body part of the user, or of at least one body node thereof, outputting data representative of a mismatch between the at least one body part of the user, or of the at least one body node thereof, and the at least one of desired spatial orientation and position.

In addition to the above features, according to some embodiments, the non-transitory computer readable medium comprises instructions that, when executed by a processing unit and associated memory, cause the processing unit and associated memory to perform operations in compliance with one or more of features (i) to (xi) above, in any technically possible combination or permutation.

According to some embodiments, the proposed solution allows analyzing a match between a motion of a user and a desired motion which improves efficiency of calculation and requires less computational resources.

According to some embodiments, the proposed solution proposes accurate, reliable and timely feedback to a user attempting to reproduce a desired motion.

According to some embodiments, the proposed solution is robust to variations among users' body sizes.

According to some embodiments, the proposed solution is operative although the user and a reference user do not have the same body dimensions.

According to some embodiments, the proposed solution is cost-efficient and is not computationally costly.

According to some embodiments, the proposed solution is operative both with two dimensional or three dimensional spatial information of the user.

According to some embodiments, a smart feedback is provided, which takes into account human body kinematics, thereby reducing computation complexity and facilitating correction of the user's motion.

According to some embodiments, the proposed solution provides pinpointed feedback which designates which body part should be corrected by the user.

According to some embodiments, the proposed solution provides smart feedback which takes into account various aspects of the activity at stake, such as importance of each body part in the activity, time synchronization between the user and the reference user, order in the sequence of poses of the user, etc.

According to some embodiments, the proposed solution can be used on various device types (e.g. mobile, laptops, smart mirrors, etc.).

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "extracting", "obtaining", "comparing", "outputting", "preventing", "normalizing", "formulating", "estimating", "computing", or the like, refer to the action(s) and/or process(es) of a computer that manipulate and/or transform data into other data, said data represented as physical, such as electronic, quantities and/or said data representing the physical objects. The term "processor" should be expansively construed to cover any kind of hardware-based electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

It can encompass a single computer or multiple computers, which may be located in the same geographical zone or may, at least partially, be located in different zones and may be able to communicate together.

The terms "non-transitory memory" and "non-transitory computer readable medium" used herein should be expansively construed to cover any volatile or non-volatile computer memory suitable for the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
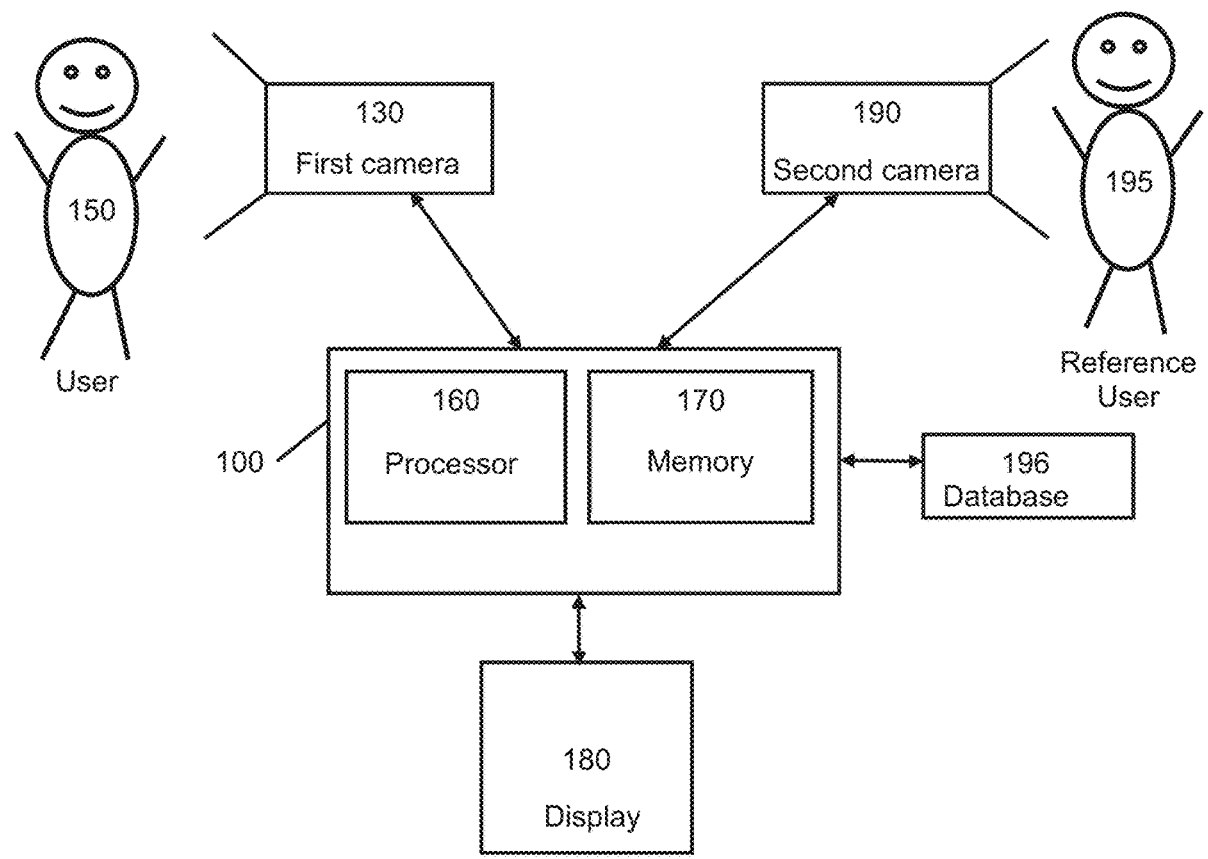
FIG. 1 illustrates a generalized block diagram of a system which can be used to perform various methods as described hereinafter.

Attention is drawn to FIG. 1.

According to some embodiments, user 150 attempts to reproduce a desired motion. The desired motion can be e.g. the motion of the reference user 195. This is not limitative, and in some embodiments the desired motion can correspond to instructions provided to a user (e.g. vocal or textual instructions, such as "please try to touch your feet with your fingers", etc.). In some embodiments, the desired motion can be created manually, e.g. by an operator. In some embodiments, the desired motion can be extracted based on a tracking system which tracks motion of a reference user. In some embodiments, the desired motion can be extracted based on a video of a reference user. In some embodiments, the desired motion can be generated based on an avatar animation.

In some embodiments, motion and/or poses of the user 150 can be compared to motion and/or poses of the user himself (e.g. in the same video at different periods of time, and/or in different videos acquired at different periods of time, etc.). This can be used e.g. to track consistency of the user in performing poses and/or specific body configurations and/or specific motions. It is referred in the various embodiments hereinafter to a "desired motion" (or "desired spatial orientation" or "desired spatial position"): this can correspond in some embodiments to a motion of the user himself.

User 150 is generally a human being. Reference user 195 can be e.g. a human being or a computer-simulated figure (such as an avatar).

For example, in a fitness application, the reference user 195 can be a fitness instructor who demonstrates certain exercises which have to be copied by the user 150.

This example is not limitative, and the method can be used in other domains. For example, a senior surgeon practices a surgery and a trainee attempts to reproduce a gesture of the senior surgeon (or of a simulation of the senior surgeon). In another example, a music student attempts to reproduce a gesture of a music teacher. Other non-limitative domains of application include dancing, martial arts, gymnastics, figure skating, etc.

FIG. 1 depicts a system 100 which can be used to carry out one or more methods as described hereinafter.

System 100 includes a processor 160 and memory circuity 170 (e.g. non-transitory memory). At least some, or all methods described hereinafter, can be executed by the processor 160 based on instructions stored in the memory circuity 170.

According to some embodiments, system 100 can include and/or can be connected to a display 180 for outputting data, and to an interface (e.g. keyboard) allowing an operator to enter data.

As shown in FIG. 1, system 100 can receive data acquired by a first camera 130. The first camera 130 acquires images from a user 150. According to some embodiments, data sensed by the first camera 130 is stored in a database which is accessed by system 100.

According to some embodiments, system 100 can receive data acquired by a second camera 190.

The second camera 190 acquires images from a reference user 195. According to some embodiments, data sensed by the second camera 190 is stored in a database which is accessed by system 100.

According to some embodiments, system 100 can communicate with a database 196 which can store a video sequence of the reference user 195, which may have been recorded in the past.

In some embodiments, database 196 stores data representative of the desired motion to be reproduced by the user. This can include, for each of a plurality of time instants, a list of body parts and/or body nodes of a human body, and a desired orientation for each body part and/or body node.

Figure 2:
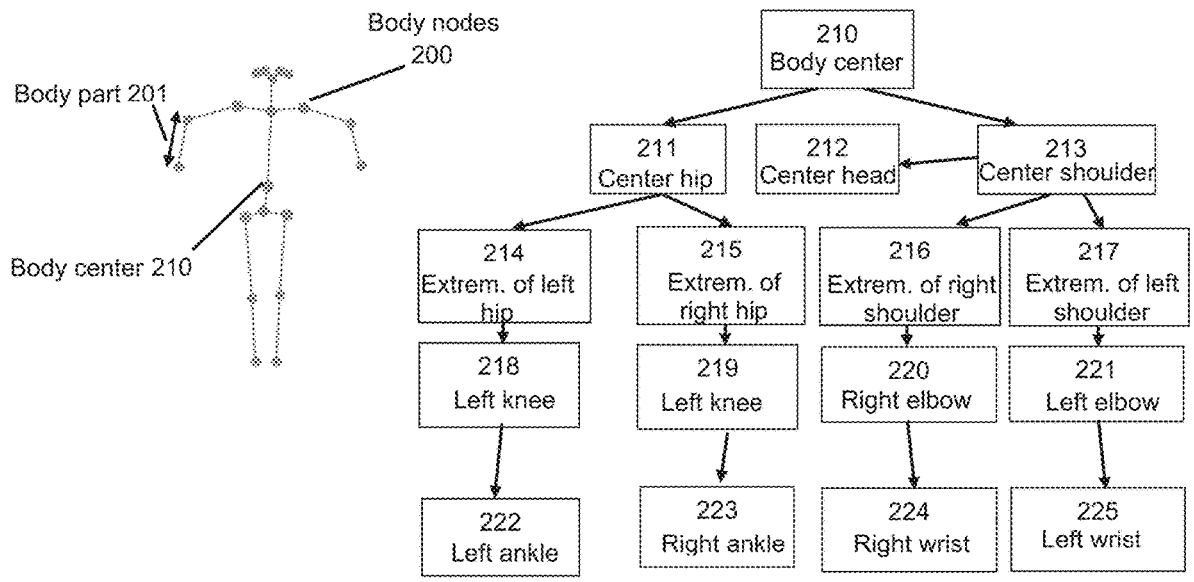
FIG. 2 illustrates a representation of human body skeleton based on body nodes, and a hierarchical representation of the body nodes representative of human body kinematics.

Attention is now drawn to FIG. 2.

In order to facilitate analysis of the user's motion, according to some embodiments, the human skeleton can be represented by at least a list of body nodes 200, which correspond to predefined points or regions of the human body. The body nodes can represent e.g. a biological joint of the body (therefore two linked nodes can represent e.g. a limb, or part of a limb) or other body regions without joints (nose, eyes, navel, etc.).

According to some embodiments, the different body nodes can be represented hierarchically.

The hierarchy typically reflects human body kinematics. In particular, the hierarchy between the different body nodes can reflect connectivity of the different body nodes in the human body, which in turn is representative of relative motion between the different body nodes in the human body.

A non-limitative representation is provided in FIG. 2, in which the body nodes are represented in a tree including parent nodes and children nodes. The tree representation is not limitative and other hierarchal representations can be used (graphs, tables, etc.).

A child node, which is linked to a given parent node, belongs to a level of the hierarchy which is lower than the level of its given parent node. A parent node which is not linked to any other nodes of an upper level is called a root node. The children nodes which are not linked to other nodes of a lower level are called the leaf node(s).

In some embodiments, a first body node is linked to a second body node in the hierarchal representation if the first body node is directly linked to the second body node in the human body (and not indirectly through other intermediate body nodes).

In some embodiments, a first body node is defined as a parent node of a second body node to which it is linked (defined as a child node) if a motion of the human body at the first body node (such as rotation, translation, etc.) can induce a motion of the human body at the second body node. This is however not mandatory.

A non-limitative example of data representative of human body kinematics is illustrated in FIG. 2. Body node 210 represents the body center, such as the navel. Body node 211 represents center hip, body node 212 represents center head, and body node 213 represents center shoulder.

Body node 214 represents extremity of left hip, body node 218 represents left knee and body node 222 represents left ankle. Indeed, motion of the human body at the extremity of the left hip can induce motion of the human body at the left knee, which, in turn, can induce motion of the human body at the left ankle.

Similarly, body node 215 represents extremity of right hip, body node 219 represents right knee, and body node 223 represents right ankle.

Body node 216 represents extremity of right shoulder, body node 220 represents right elbow, and body node 224 represents right wrist.

Indeed, motion of the human body at the extremity of the right shoulder can induce motion of the human body at the right elbow, which, in turn, can induce motion of the human body at the right wrist.

Similarly, body node 217 represents the extremity of left shoulder, body node 221 represents left elbow, and body node 225 represents left wrist.

Figure 2A:
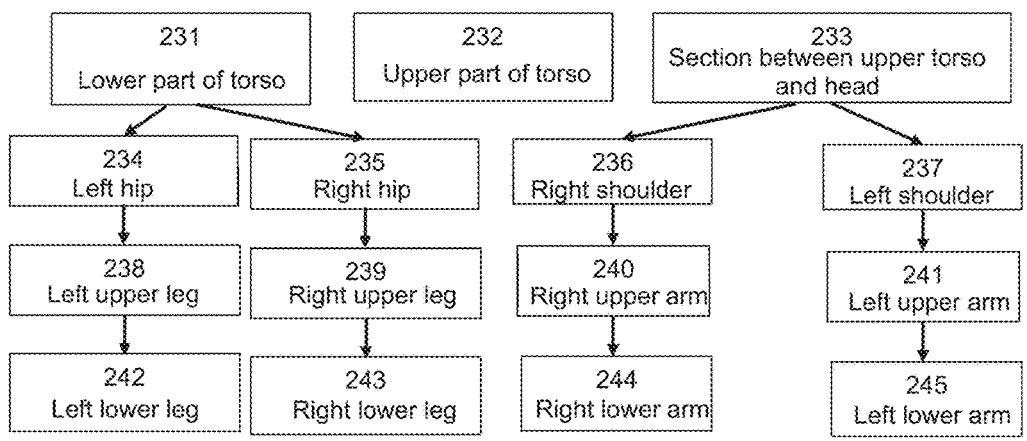
FIG. 2A illustrates a non-limitative example of a hierarchical representation of body parts, which is representative of human body kinematics.

The hierarchical representation according to body nodes as depicted in FIG. 2 is not limitative, and a similar hierarchical representation according to body parts can be represented, as illustrated in the non-limitative example of FIG. 2A, This is due to the fact that two (or more) body nodes can define a body part. For example, in the left part of FIG. 2, body part 201 (lower arm) corresponds to a body section located between left elbow and left wrist.

In some embodiments, a first body part is connected to a second body part if there is a direct connection between them in the human body (and not indirectly through another body part).

In some embodiments, a first body part is defined as a "parent" (in the hierarchical representation) of a second body part (defined as a "child" in the hierarchical representation) if a motion of the first body part can induce a motion of the second body part.

In FIG. 2A, body part 231 represents lower part of torso, body part 232 represents upper part of the torso, and body part 233 represents a section between the upper torso and head of the user.

Body part 234 represents left hip, body part 238 represents left upper leg, and body part 242 represents left lower leg.

Body part 235 represents right hip, body part 239 represents right upper leg, and body part 243 represents right lower leg.

Body part 236 represents right shoulder, body part 240 represents right upper arm, and body part 244 represents right lower arm.

Body part 237 represents left shoulder, body part 241 represents left upper arm, and body part 245 represents left lower arm.

According to some embodiments, a hierarchal representation which mixes body parts and body nodes can be also used (this hierarchal representation represents connectivity between the different body nodes/body parts in human body, similarly to the embodiments described above).

According to some embodiments, the hierarchical representation can vary depending on the task or application. For example, when it is desired to evaluate correct performance of a user in yoga, it is recommended to first evaluate the position of the feet. Therefore, a root node can include left foot, which is a parent node of left knee, which is itself a parent node of left hip, etc. In other words, at least the order of the different nodes can be changed in the hierarchy depending on the application.

Figure 3:
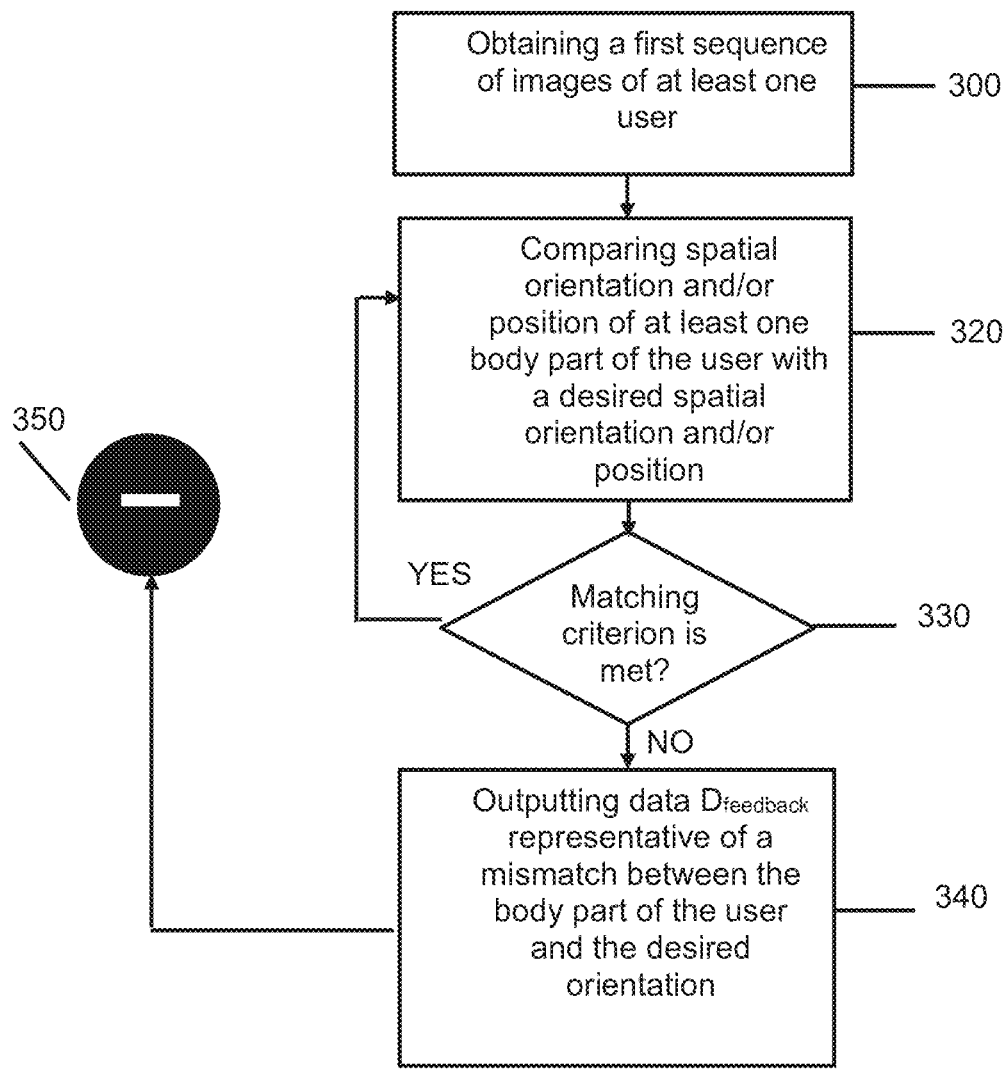
FIG. 3 illustrates a diagram of an embodiment of a method of comparing one or more poses of a user in a sequence of images with one or more desired poses.

Attention is now drawn to FIG. 3.

A method includes obtaining (operation 300) a first sequence of images of a user (e.g. user 150). As mentioned above, the user attempts to reproduce a desired motion, for example of a reference user (e.g. 195), such as a fitness instructor.

The method can include determining correct performance of at least one pose of the user in the first sequence of images. This method can be used for a plurality of poses of the user.

As mentioned above, in some embodiments, a second sequence of images of the reference user is displayed to the user while he is attempting to reproduce motion of the reference user. Therefore, data representative of poses of the reference user (for example key poses of the reference user) can be extracted from the second sequence of images similarly to what is explained hereinafter for the reference user. In some embodiments, this extraction can be performed in parallel to the user, or has been performed beforehand during a pre-processing phase (output of this pre-processing is therefore already available and stored e.g. in a database).

In some embodiments, data representative of the pose(s) of the reference user has already been extracted during a pre-processing phase and spatial orientation and/or position of each body part of the reference user in each of these poses is already available and stored e.g. M a database.

In some embodiments, the desired motion includes a list of body parts and/or body nodes of a human body, and a desired orientation and/or position for each body part and/or body node for each of a plurality of time instants. This data can be used to determine correct performance of the pose of the user over one or more images.

The method can include, for at least one image, comparing (320) the spatial orientation and/or position (e.g. at time t) of a body part of the user from a plurality of body parts of the user with a desired spatial orientation and/or position (also at time t). In some embodiments, operation 320 can be performed for more than one body part of the plurality of body parts. In some embodiments, several comparisons can be performed in parallel, or subsequently. In some embodiments, orientation and/or position of one or more body nodes of the body part is compared to a desired orientation and/or position. Non limitative embodiments for performing the comparison will be described with reference to FIGS. 5, 6 and 7.

As explained hereinafter, in some embodiments, body parts (or body nodes) for which a comparison is performed are selected according to a predefined order (see e.g. the example of FIG. 4, which relies on a hierarchical representation as depicted e.g. in FIGS. 2 and 2A). In some embodiments, comparison of a next body part with the desired orientation can be prevented depending on the output of the comparison of a previous body part. Specific embodiments will be provided hereinafter (see e.g. FIG. 4).

As already mentioned above, the desired spatial orientation can include the spatial orientation and/or position of a corresponding body part of the reference user (at a comparable period of time).

For example, if spatial orientation and/or position of the left upper arm of the user has been determined at time $t_1$, it can be compared to the desired spatial orientation and/or position of the left upper arm at time $t_1$ ($t_1$ is measured e.g. with respect to a starting time which corresponds to the beginning of both the first and second sequences of images), or in a time window including t1 (e.g. [t1−dt, t1+dt], with dt determining the acceptable tolerance in timing).

Spatial orientation can include e.g. determining an angle of the body part (or angular position of a body node) in a predefined referential, such as a referential of the image. Embodiments for computing spatial orientation of a body part will be described hereinafter (with reference e.g. to FIGS. 5, 6 and 7).

Spatial position can be determined based on the position of the different body parts (or body nodes) of the user (or reference user) in the image. As explained hereinafter, position can be normalized with respect to the height of the user in each image (respectively of the reference user in each image). In addition, position of the user and the reference user can be projected in a common referential, in order to be comparable.

For example, the position (e.g. after normalization) of a body node (for example the navel) of the user can be compared to a position (e.g. after normalization) of a corresponding body node (e.g. the navel) of the reference user.

If the comparison does not meet a matching criterion (for example an angle representing the difference between the orientation of the body part of the user and the desired orientation is above a threshold, and/or a difference in position is above a threshold), then the method can include outputting (340) data representative of a mismatch between the body part of the user and the desired orientation and/or position (e.g. orientation and/or position of the corresponding body part of the reference user).

This is useful for a user who gets information on a specific body part which has been identified as failing to match the desired motion, and which should be corrected.

According to some embodiments, a group of body parts can be evaluated, in order to provide a more complex feedback, e.g. on specific body pose/body configuration. For example, assume that according to the desired pose, the user is required to have a straight arm. This body configuration depends on a group of body parts (lower arm, upper arm). Therefore, evaluation of the different body parts of the group has to be performed in order to provide a feedback common to the group of body parts.

This can be evaluated e.g. by determining whether an angle between the upper arm and the lower arm is close to zero. This can be also evaluated by determining whether various body nodes located along the arm of the user are located on the same straight axis.

According to some embodiments, a library which includes a list of predefined configurations of one or more groups of body parts can be provided. This library can be stored. e.g. in memory 170.

These (desired) configurations can represent semantically meaningful body configurations, and therefore can be expressed using at least one semantic expression (e.g. "straight arm(s)", "straight leg(s)", "arms parallel", etc.). Each configuration can be associated with data representative of the desired spatial orientation and/or position of body parts/body nodes relevant for this configuration.

According to some embodiments, this library can be used to provide specific instructions to the user regarding a desired configuration of a group of body parts (e.g. "please keep your arms straight").

According to some embodiments, this library can used to evaluate whether the user complies with the desired configuration of a group of body parts by comparing spatial orientation and/or position of body parts; body nodes of the user with data representative of the desired configuration. In addition, a semantic feedback can be provided to the user for each configuration (e.g. "you correctly performed the pose "straight arms"").

Figure 3A:
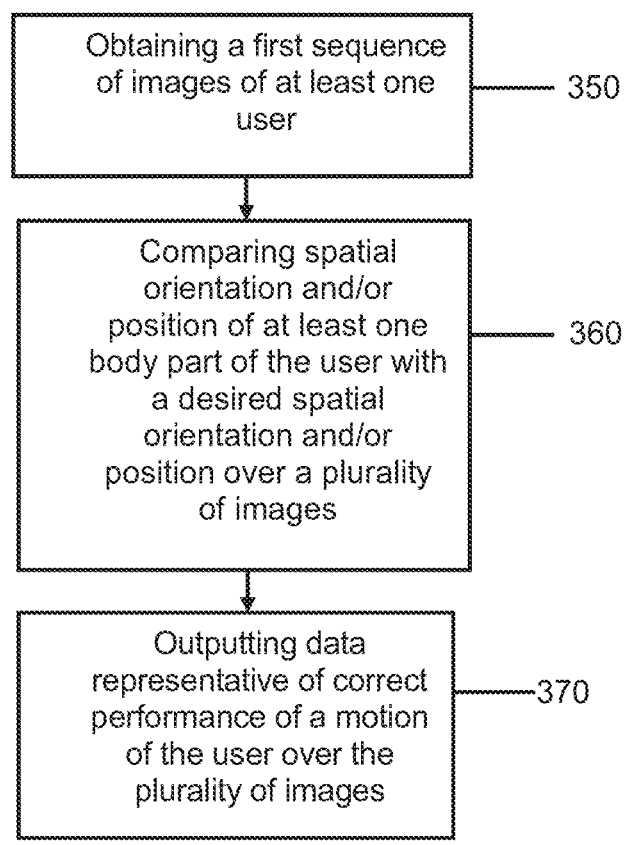
FIG. 3A illustrates a diagram of an embodiment of a method of comparing motion of a user in a sequence of images with a desired motion.

As shown in FIG. 3A, in some embodiments, a motion of user can be evaluated with respect to a desired motion.

In some embodiments, the method of FIG. 3A can be performed in parallel to the method of FIG. 3.

In some embodiments, correct performance of a body part (or more generally of a pose) of the user is first evaluated in an image, and if the output of the evaluation is positive, motion of the user over a plurality of images can be evaluated, as explained with reference to FIG. 3.

In some embodiments, the method of FIG. 3A can be performed independently from the method of FIG. 3.

In the method of FIG. 3A, a motion is evaluated, therefore a sequence of poses is to be compared to a sequence of desired poses (whereas in FIG. 3 each static pose can be evaluated independently for each image, and not necessary in combination with other static poses).

The method can include obtaining (350, similar to 300) a first sequence of images of at least one user. The method can include comparing (360) spatial orientation and/or position of at least one body part (or of a body node thereof) of the user with a desired spatial orientation and/or position over a plurality of images. The plurality of images are not necessarily consecutive images in the video of the user. In some embodiments, the plurality of images can be selected at periods of time which correspond to key poses of the reference user. In some embodiments, additional images located between key poses of the reference user can be also selected.

This comparison allows determining whether the motion of the user complies with the desired motion. In some embodiments, the motion can include a motion towards a certain direction (e.g. motion of body in a certain direction, motion of the arm from left to right, etc.). In some embodiments, the motion can include evaluating whether a specific action is performed (e.g. a step, a jump, etc.).

For a step, the method can include e.g. comparing the position of the feet and of the legs of the user on a plurality of images with a sequence of desired positions representative of a step.

In some embodiments, a specific body part has to perform a desired motion. For example, assume the desired motion includes moving the left leg such that it moves away from the right leg (and not the other way round). The method can include comparing e.g. position of the left leg with a desired position of the left leg over a plurality of images, and comparing the position of the right leg with a desired position of the right leg over a plurality of images (to verify that the left leg is moving away from the right leg, and not conversely). These examples are purely illustrative and not limitative.

In some embodiments, operation 360 can include using dynamic warping (the input of the method can include a first signal corresponding to the list of spatial orientations and/or positions of the user over the plurality of images, and a second signal corresponding to the list of desired spatial orientations and/or positions over the plurality of images).

According to some embodiments, a library which includes a list of specific motions (or actions) can be provided. This library can be stored e.g. in memory 170.

These (desired) motions can represent semantically meaningful body motions, and therefore can be expressed using at least one semantic expression (e.g. "jumps", "steps", "turns", "squads", etc.). Each motion can be associated with data representative of the desired spatial orientation and/or position of body parts/body nodes relevant for this motion over a plurality of images.

According to some embodiments, this library can be used to provide specific instructions to the user regarding a desired motion to be performed (e.g. "please perform a jump").

According to some embodiments, this library can used to evaluate whether the user complies with the desired motion by comparing spatial orientation and/or position of body parts/body nodes of the user with data representative of the desired motion over a plurality of images. In addition, a semantic feedback can be provided to the user for each motion (e.g. "you correctly performed the motion "jump"").

Based on the comparison performed at 360, the method can include outputting (370) data representative of correct performance of a motion of the user over the plurality of images. In some embodiments, if a specific body part/body node (respectively specific body parts/body nodes) is (respectively are) evaluated, the data can include a pinpointed feedback, which indicates whether a specific body part/body node (respectively specific body parts/body nodes) has (respectively have) correctly performed the desired motion. In some embodiments, a feedback can include indication helping the user correcting his motion.

In light of the various methods described above, various data (hereinafter $D_{feedback}$) can be provided to the user as a feedback.

In some embodiments, $D_{feedback}$ can include data explaining to the user how he should correct or improve the orientation and/or position of his body part. A non-limitative example can include: "please raise up your leg by 10 degrees". $D_{feedback}$ can be provided in a wide variety of forms to a user: textual output (such as natural language description), visual output (such as an overlay on top of the user's image, e.g. by highlighting the wrong body parts or body nodes), audio output (by speech or sound), etc. In some embodiments, the feedback can include highlighting the desired (correct) position and/or orientation (e.g. on an image or video), and/or visualizing the direction of movement for correction (e.g. with arrows superimposed on an image or video).

In some embodiments, the feedback can be provided for a plurality of body parts (or body nodes) which have been identified as mismatching the desired orientation and/or position.

In some embodiments, the feedback can be representative of the number of body parts (or body nodes) which are mismatching. For example, if only a small number of body parts is mismatching, the feedback will be different than if a large number of body parts is mismatching.

In some embodiments, the feedback can be representative of the level of mismatching of the body parts (or body nodes). For example, body parts for which a strong mismatch has been identified can be more highlighted than body parts for which a low mismatch has been identified.

In some embodiments, the feedback can be representative of the criticality of the body part (or body node) for the current pose. For example, a weight can be stored for each body part, and for each desired pose (e.g. pose of the reference user), which indicates to what extent each body part is important in this pose, etc. As a consequence, a stronger feedback will be output for body parts which are assigned with a higher weight. Attribution of a weight is also useful for prioritizing and/or filtering the feedback to be provided to the user (e.g. per pose, per sequence of poses, per move, per action, etc.).

According to some embodiments, the feedback can include temporal information for the user (e.g. "move faster", "out of synchronization", etc.). Temporal information can be relevant for a pose in an image (e.g. to what extent the current pose is in line with the desired pose at this time), and/or for a plurality of poses in a plurality of images (e.g. indication whether the motion of the user is fast enough for example the user performs a correct sequence of poses over a plurality of images, but with a delay with respect to the reference user, which indicates that the motion of the user is not fast enough, etc.).

For example, assume that a pose is defined by at least a list including spatial orientation of each of a plurality of body parts. According to some embodiments, the feedback includes data representative of a time delay between a pose of the user in an image at a first time, and a desired pose expected at a second time.

For example, a pose can be extracted for each image of the user. The desired poses for a plurality of time instants can be available in a database or can be extracted from a sequence of images of the reference user. Assume that pose $P_1$ has been extracted from an image of the user at time $T_1$. It is possible to search for a similar pose among the desired poses. Assume that a similar pose $P_1$ has been identified among the desired poses, but only at time $T_2$ (different from $T_1$). The time delay between the pose of the user and the desired pose can be calculated as the difference between $T_2$ and $T_1$. Data representative of this time delay can be output e.g. to the user (e.g. "you are behind the music by 200 ms"). Of course, if $T_1$ and $T_2$ are equal, then the time delay is equal to zero, and in some embodiments, a positive feedback can be output to the user.

According to some embodiments, the feedback can include data representative of differences between an order of poses of the user and a desired order of poses (e.g. of a reference user).

Assume that the desired motion to be reproduced is defined as an ordered sequence of poses $P_1$ to $P_N$ (wherein $P_i$ is corresponding to time $T_i$). Assume that the motion of the user in the sequence of images includes some or all of poses $P_1$ to $P_N$, but in a different order. Data representative of this difference can be output to the user (during motion of the user and/or after end of the first sequence of images). A feedback can include e.g. "you flipped pose 2 and pose 3".

According to some embodiments, differences between a plurality of poses of the user (over a plurality of images) and a plurality of desired poses can be computed, and an aggregated feedback can be provided. For example, the feedback can include: "on average over the last 10 seconds, poses have been compliant with the desired motion". Therefore, in some cases, although for one pose considered separately the pose of the user may have been detected as uncompliant, on average, the plurality of poses can sometimes be considered as compliant.

According to some embodiments, a similarity score is generated for each of a plurality of body parts (or body nodes), based at least on the comparison performed at operation 320. The similarity score reflects to what extent the orientation and/or position of the body part of the user is similar to the desired orientation and/or position. In some embodiments, the higher the similarity score, the higher the similarity. An overall similarity score can be computed and output to the user, which can correspond e.g. to the minimum of all similarity scores.

As explained above, various feedback data can be provided to the user. In some embodiments, the method can include selecting only a subset of the feedback data to be provided to the user. In some embodiments, the method can include e.g. prioritizing and/or filtering feedback data, in order to provide to the user relevant and useful feedback data.

In some embodiments, if a mismatch between a body part (or body node) of the user and the desired orientation and/or position has been identified, the sequence of images (or video) of the reference user (which can be provided to the user while he is attempting to reproduce motion of the reference user) is stopped until the user corrects orientation and/or position of his body part.

In other embodiments, the sequence of images of the reference user is not stopped, and $D_{feedback}$ can be provided offline, after completion of the sequence of images of the reference user (the feedback can indicate e.g. for each key pose, to what extent the user has matched motion of the reference user).

Reverting to FIG. 3, in some embodiments, if the comparison meets the matching criterion (see 330), the method can include outputting a feedback representative of a match for this body part (or body node).

If the comparison meets the matching criterion (see 330), the method can include comparing a spatial orientation and/or position of another body part (or body node thereof) of the user with a desired spatial orientation and/or position (this corresponds to operation 320 which is repeated for the other body part).

If the comparison does not meet a matching criterion, the method can include outputting data representative of a mismatch between the other body part of the user and the desired orientation and/or position (or any other feedback as described above). If the comparison meets a matching criterion, the method can include repeating the comparison for an additional body part.

In each image of the first sequence of images, the user can have a different pose, and therefore it is possible to repeat operations described in FIG. 3 for each of a plurality of images of the user. In some embodiments, the method includes selecting key poses among the desired poses for which the pose of the user is compared to the desired pose.

In some embodiments, selection of key poses can include computing spatiotemporal curvature of the motion of the reference user (see View-Invariance in Action Recognition, IEEE Computer Society Conference on Computer Vision and Pattern Recognition, February 2001, Section 3.2—this document is incorporated by reference in its entirety). The key poses can be selected as corresponding to local maxima in this curvature. This is however not limitative and other methods can be used to select key poses. In some embodiments, an operator can predefine key poses manually. For example, a fitness trainer can label key poses in a video of his fitness lesson. In some embodiments, key poses can be selected based on temporal information of a music accompanying the video (e.g. rhythm of the music).

According to some embodiments, if a first body part of a user in a current image has been identified as mismatching the desired orientation and/or position, the method can include preventing (see reference 350) from evaluating whether an orientation and/or position of a given second body part (or body node thereof) of the user in the current image matches a desired orientation and/or position.

The given second body part can be predefined with respect to the first body part. A memory can store a rule that one or more given second body parts are associated with the first body part, and therefore if the first body part of a user is identified as mismatching in an image, the given second body part(s) associated with it are not evaluated at this stage in this image (however, other body parts which are not associated with the first body part can be evaluated).

This rule can reflect e.g. the fact that the user should first correct orientation and/or position of the first body part, and therefore it is not useful to provide at this stage a feedback on the second body parts which are related or linked to this first body part. Indeed, if the user corrects orientation and/or position of the first body part, it can be expected that this will also correct the orientation and/or position of the second body parts which are related or linked to this first body part.

Lastly, feedback which includes too many data can be confusing for the user.

Figure 4:
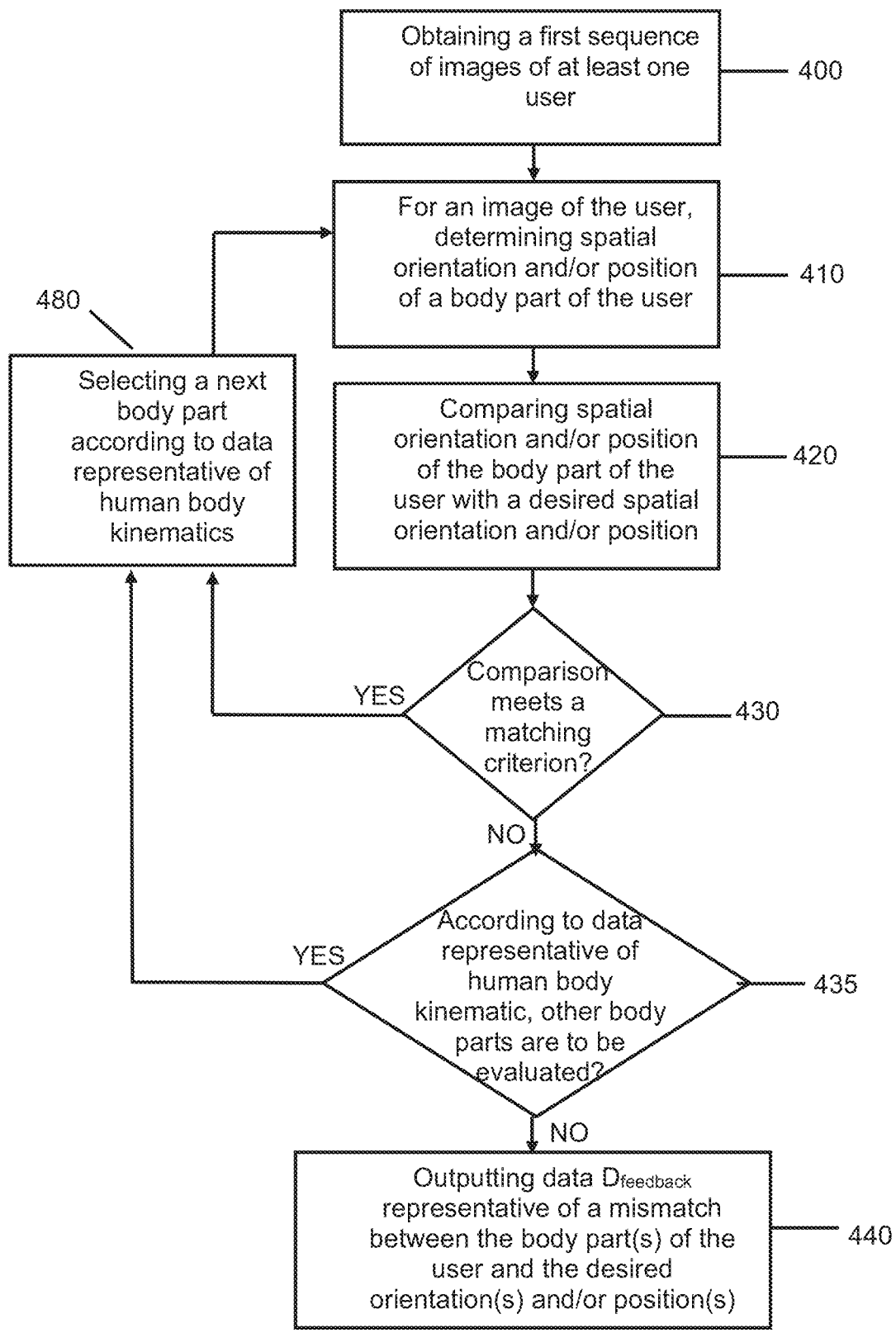
FIG. 4 illustrates a diagram of an embodiment of a method of comparing one or more poses of a user in a sequence of images with one or more desired poses.

In some embodiments, and as explained further with reference to FIG. 4, the given second additional body part (or body node) can be selected based on a hierarchical representation of body parts (or body nodes) of the human body (such as the representation of FIGS. 2 and 2A).

Attention is now drawn to FIG. 4. The method of FIG. 4 can be, in some embodiments, a specific embodiment of the method of FIG. 3. This is, however, not limitative.

According to some embodiments, a method can include for an image (of time t) of the user, determining (410) spatial orientation and/or position of a body part of the user and comparing (420) spatial orientation and/or position of the body part (or body node thereof) of the user with a desired spatial orientation and/or position (e.g. of a corresponding body part of the reference user) at a similar time.

If the comparison meets a matching criterion (see 430), the method can include comparing an orientation and/or position of a next body part (or body node thereof) of the user with a desired spatial orientation and/or position (see reference 480 in which the next body part is identified, and references 410, 420 and 430 in which the process is repeated for this next body part).

Selection of the next body part can be based on data representative of human body kinematics. In particular, according to some embodiments, selection of the next body part can be based on a hierarchical representation of body parts and/or body nodes as described with reference to FIGS. 2 and 2A.

As mentioned above, this data can include a representation of at least one of body nodes and body parts, wherein the representation is hierarchical and representative of connectivity between the at least one body node and body part in a human body.

Assume that the current body part (for which a comparison with the reference user has indicated a match with the desired orientation and/or position) is represented by a given parent node in the hierarchical representation of FIG. 2 or 2A.

If the representation of FIG. 2A is used (in Which body parts are stored), then the given parent node represents the current body part itself.

If the representation of FIG. 2 is used (in which body nodes are stored), then the given parent node corresponds to an extremity of the current body part.

The next body part can be identified by selecting (at operation 480) a child node of the given parent node.

For example, assume that the current body part is the upper part of the right arm. In FIG. 2, this corresponds to parent node 220 (right elbow), and in FIG. 2A, this corresponds to parent node 240 (upper right arm). The next body part is the lower part of the right arm. In FIG. 2, this corresponds to child node 224 (right wrist), and in FIG. 2A, this corresponds to child node 244 (lower right arm).

In some embodiments, the hierarchical representation of body parts and/or body nodes can be used to select the first body part of the user to be evaluated in an image. For example, a root node of the hierarchical representation can be selected as the first body part. As mentioned above, the hierarchical representation is also useful to select the next body parts, which can be selected by traversing the hierarchical representation (e.g. tree) in a direction from the root node towards the leaf nodes.

If the comparison (see 430) does not meet the matching criterion for the current body part (or body node), the method can include checking (see 435) whether other body parts (or body nodes) of the user are to be analyzed, based on data representative of human body kinematics (which include e.g. hierarchical representation of the human body, as mentioned above).

In some embodiments, if the current body part (or body node) of the user has been identified as not matching the desired orientation and/or position, the method can prevent from comparing a spatial orientation of a given next body part (or body node) of the user from the plurality of body parts with a desired spatial orientation and/or position, wherein the given next body part (or body node) is selected based on the data representative of human body kinematics.

In particular, the given next body part(s) can be selected as children node(s) of the current body part.

Indeed, by outputting a feedback on the current body part, it can be expected that the user will also correct other body parts which are connected to the current body part and which are represented as children nodes of the current body part. Therefore, calculation complexity and computation time are reduced, while still allowing improvement of the user's pose.

In addition, outputting a complex feedback on various body parts can be confusing for the user.

In some embodiments, the method prevents the comparison for the given next body part only for the current image which is evaluated (because in another image the user can have another pose, and the current body part can have another orientation). In some embodiments, the method prevents this comparison until a stopping criterion is met.

The stopping criterion can correspond to a predetermined time, e.g. which is calibrated to provide sufficient time for a user to correct his pose.

In some embodiments, the stopping condition can correspond to receipt of a command e.g. by the user (who can indicate that he has attempted to correct his pose, and therefore requires a new evaluation of correct performance of his pose—in this case the method of FIG. 4 can be started from scratch, or from the given next body part for which comparison has been prevented).

At operation 435, it may occur that other body parts (or body nodes), which are not children of the current body part (or body node), have not been yet analyzed and therefore should be selected as the next body part(s) (or body nodes).

For example, assume that the current body part is linked to a parent node which is itself linked to a plurality of other children nodes. The next body part can be selected as one of these other children nodes, which is not the current body part. In a non-limitative example, assume that the current body part is left hip 234 (see FIG. 2A), which is a child node of parent node 231 (lower part of torso). Assume that left hip 234 has been identified (at operation 330) as mismatching the desired orientation. Then the method can include preventing from evaluating left upper leg 238 and left lower leg 242, which are children nodes of the current body part. At operation 335, it appears that the right hip (body part 235) has not yet been analyzed. Therefore, body part 235 can be selected as the next body part.

In another example, another body part, which has not been yet analyzed, and which is not a child node of the current body part, can be selected. In the example below, body part 233 can be selected as the next body part (this is not limitative).

In some embodiments, a plurality of body parts (or body nodes) can be analyzed in parallel and each compared with the corresponding desired spatial orientation, in order to save time.

In some embodiments, the comparison between the pose of the user and the pose of the reference user can include comparing a position of a body center (e.g. navel) of the user with a desired position (e.g. a position of a corresponding body center of the reference user). This can help to verify that the general motion of the user follows the desired general motion (e.g. of the reference user). For example, if the reference user runs towards a given location of the room, this can help to verify that the user is also running towards this given location.

This can include aligning the positions of the user and of the reference user in the first frame. Alignment of the positions of the user and of the reference user can include e.g. normalizing both the pose of the user and the pose of the reference user to have comparable body height (see e.g. operations 510/610), and defining a common referential origin in the first frame. This can include shifting the position of a body center of the user and the position of a body center of the reference user to this common referential origin. The method can then include tracking (and comparing) the motion of user and reference user in the next frames with respect to the common referential origin as defined in the first frame (e.g. this can indicate that user goes right, but he should go left as the reference user). In the next frames, a normalization of the positions of the user/reference user can be also performed, with the same factor as in the first frame, In order to detect the motion of the user (respectively of the reference user) towards or away from the camera, in some embodiments, initial ratio between height of the body of the user in the image and his real height is evaluated in the first image, and this ratio is calculated for each image and compared to the initial ratio.

At operation 435, if it is indicated that no additional body part (or body node) needs to be evaluated (as mentioned above, according to some embodiments, if a given body part of the user has been identified as mismatching the desired orientation, the body parts represented as children nodes of the given body part are not evaluated), the method can include outputting (operation 440) feedback.

In particular, the feedback can include data representative of a mismatch between the body part(s) (or body node thereof) of the user and the desired orientation(s) and/or position(s) (e.g. of the corresponding body part(s) of the reference user). Various examples of feedback (see e.g. $D_{feebdack}$) have been provided with reference to FIG. 3 (see operation 340) and can be used herein similarly (therefore they are not described again and one has to refer to the section above).

In some embodiments, the feedback can also include data representative of a match between the body part(s) (or body node(s) thereof) of the user and the desired orientation(s) and/or position(s).

The operations described in FIG. 4 are not necessarily performed in the depicted order. For example, in some embodiments, an intermediate feedback can be already output between operation 430 and operation 435. In some embodiments, various body parts of the user can be evaluated in parallel.

In some embodiments, instructions are stored in a memory and include a predefined sequence in which the body parts are to be evaluated according to the method of FIG. 4 (the instructions can be executed by a processor and memory circuitry). The instructions can store the one or more body parts which are the first body parts to be evaluated (e.g. root nodes of the hierarchical representation). The instructions can include that, for each current body part which is evaluated:
- if the current body part is matching, then a next body part is to be selected (the next body part can be predefined, and has been encoded in the instructions based on the hierarchical representation of the human body, which defines children nodes of the current node);
- if the current body part is not matching, then it is checked whether other body parts are to be evaluated, and if not, the final feedback is output.

Similarly to the method of FIG. 3, the method of FIG. 3A (determination of correct motion of the user over a plurality of images) can be performed in parallel with the method of FIG. 4, or after/before the method of FIG. 4.

Figure 4A:
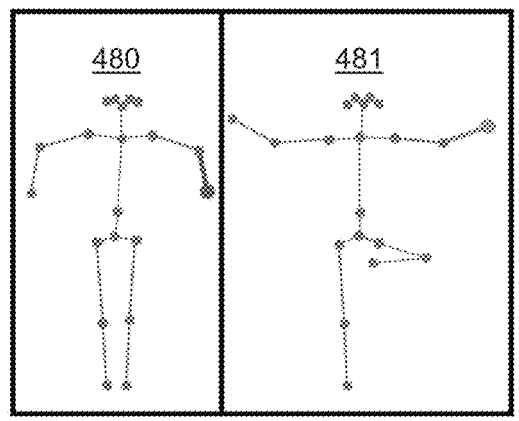
FIG. 4A illustrates a pose of a user in an image to be compared with a pose of a reference user in an image.
Figure 4B:
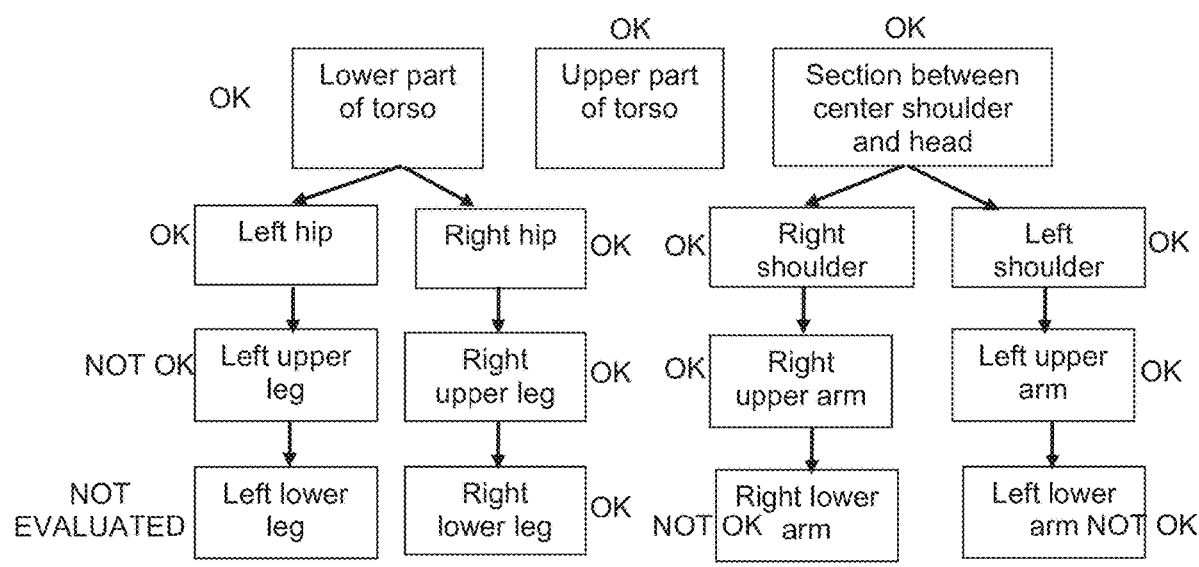
FIG. 4B illustrates a hierarchical representation of body parts which are evaluated according to the method of FIG. 4.

A non-limitative example of the method of FIG. 4 is provided in FIGS. 4A and 4B.

An image of a user 480 has been acquired. A schematic representation of the user is represented, in which the position of specific body nodes (which define body parts) is highlighted. Similarly, an image of a reference user 481 is depicted, in which the position of specific body nodes is highlighted. The image of the user and the image of the reference correspond to similar periods of time.

As visible in FIG. 4A, the user 480 does not correctly reproduce the pose of the reference user.

The method of FIG. 4 can be applied to detect this mismatch, and help the user improve his pose.

As explained with reference to FIG. 4, the ordered selection of the body parts to be evaluated is based on data representative of human body kinematics.

As shown in FIG. 4B, the orientation of the lower part of the torso matches the reference user, therefore right hip and left hip are then evaluated. Since their orientation also match the reference user, left upper leg and right upper leg are also evaluated against the reference user. It is detected that the orientation of the left upper leg of the user does not match the orientation of the corresponding left upper leg of the reference user. Therefore, body parts which are children nodes of the left upper leg are not evaluated for this image (in this example, the child node is only left lower leg).

It appears that other body parts have not yet been evaluated, that is to say right upper leg, which matches the reference user, and right lower leg, which also matches the reference user.

The same process is repeated for the upper part of the torso, which matches the reference user.

The same process is repeated for the section between the center shoulder and head, right shoulder, right upper arm, and right lower arm. Only the right lower arm is identified as mismatching the reference user. Since the right lower arm corresponds to a leaf node, there is no child node that should be prevented from evaluation.

The same process is repeated for left shoulder, left upper arm, and left lower arm. Only the left lower arm is identified as mismatching the reference user. Since the left lower arm corresponds to a leaf node, there is no child node that should be prevented from evaluation.

The feedback $D_{feedback}$ can indicate to the user that he should correct orientation of his left upper leg, right lower arm and left lower arm. It can include indications which guide the user in correcting this orientation, or other feedbacks as explained above.

If a hierarchical representation based on body nodes is used (see FIG. 2), then an equivalent feedback can be provided, which indicates e.g. to the user that he should correct orientation of his left knee, right wrist and left wrist.

Figure 5:
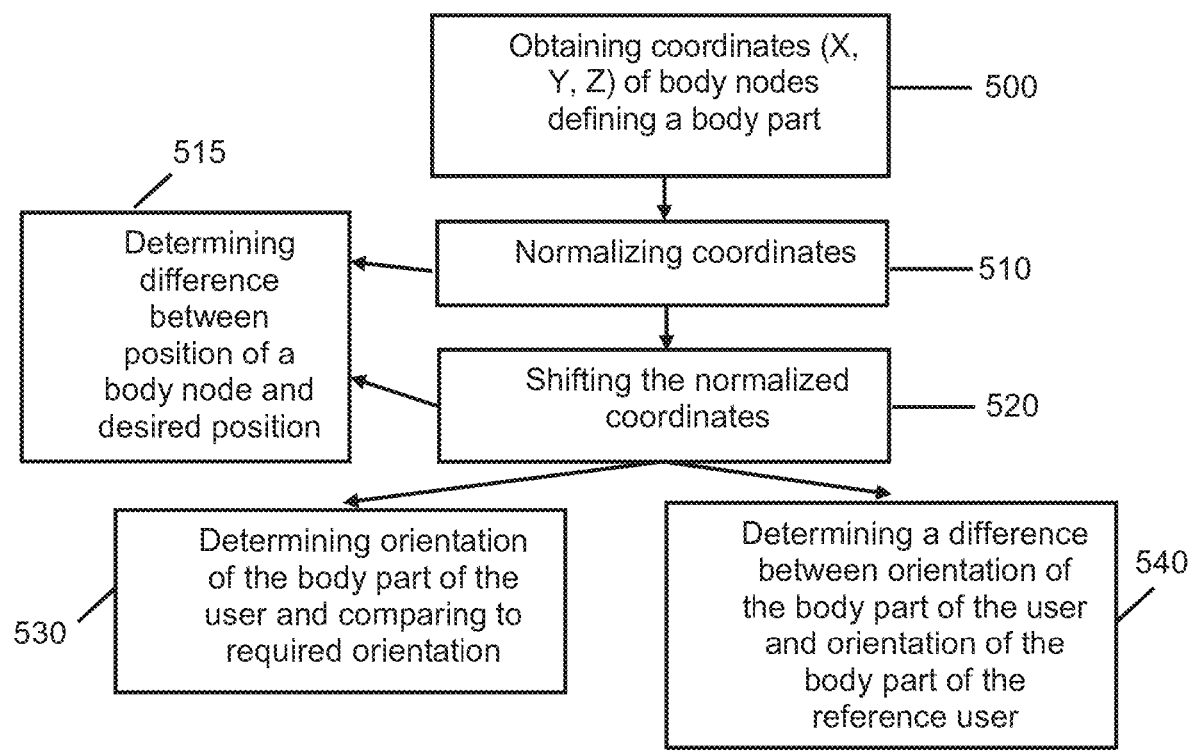
FIG. 5 illustrates a diagram of a method of comparing orientation or position of a body part/body node of a user with a desired orientation or position, when three dimensional position data is available.

Attention is now drawn to FIG. 5, which depicts a method of comparing orientation and/or a position of a body part (or body node thereof) of a user with a desired orientation and/or position (e.g. of a corresponding body part of a reference user). This method is provided as a non-limitative example, and other adapted methods can be used.

Assume that a body part is defined by a segment joining two body nodes (first body node corresponding to a first extremity of the body part, and second body node corresponding to a second extremity of the body part—examples of body nodes are provided in FIG. 2). In some embodiments, if three dimensional position data is available (see operation 500) for the user (for example because at least two cameras are acquiring the motion of the user), the position of each body node of the user is defined by three coordinates, Assume that the second body node (second extremity of the body part of the user) has coordinates $X_1, Y_1, Z_1$. Generally, these coordinates are defined in the referential of the image which corresponds to the referential of the room. In some embodiments, the third coordinate (Z) can be determined based on images of the user acquired by two cameras and by using a triangulation method (see e.g. Hartley, Richard I., and Peter Sturm. "Triangulation", *Computer vision and image understanding* 68.2 (1997): 146-157.)

Position of the body nodes can be extracted from the image by using image recognition algorithms, which rely e.g. on machine learning methods, such as a deep neural network trained to estimate coordinates of the body nodes. Such network can be trained based on a pictures of persons in which positions of the body nodes have been annotated by human annotators. (see e.g. Toshev, Alexander, and Christian Szegedy. "Deeppose: Human pose estimation via deep neural networks." *Proceedings of the IEEE conference on computer vision and pattern recognition.* 2014.)

In some embodiments, the method can include normalizing (operation 510) the coordinates (this is however not limitative). The normalized coordinates of the second body node of the user are $X_{1,norm}, Y_{1,norm}, Z_{1,norm}$. This can be performed also for the first body node. This can include, for each image, dividing the coordinates by the body height of the user in this image (the body height in the image depends e.g. on proximity of the user with respect to the camera). The same can apply to the reference user (to obtain $X_{2,norm}, Y_{2,norm}, Z_{2,norm}$). This facilitates comparison between the user and the reference user.

In some embodiments, body height of the user in the image can be estimated by determining the longest body part of the user which can be found in the image.

In other embodiments, assume data representative of human body proportions is available. If length of a body limb is determined in the image, then body height of the user in the image can be estimated (for example, it is known that a given body limb has generally a length which is ⅛ of the body height of the user, and therefore, body height can be estimated). This can be performed based on a plurality of body limbs and aggregation of all the results can provide a global estimation of the body height.

If position of a body part/body node is to be compared with a desired position, then it is possible to compare $(X_{1,norm}, Y_{1,norm}, Z_{1,norm})$ to $(X_{2,norm}, Y_{2,norm}, Z_{2,norm})$ (see operation 515).

In some embodiments, the method can further include shifting (operation 520) the normalized coordinates in another referential. In particular, the position of the second body node (second extremity of the body part) can be expressed in a referential affixed to the first body node (first extremity of the body part). The normalized shifted coordinates are $X_{1,norm,shift}, Y_{1,norm,shift}, Z_{1,norm,shift}$. The same can apply to the reference user (to obtain $X_{2,norm,shift}, Y_{2,norm,shift}, Z_{2,norm,shift}$). This is however not limitative.

If the desired orientation $\alpha_{ref}$ (represented by three angles in 3D, such as roll, pitch and yaw, and/or by Euler angles) is available, then the method can include (see operation 530) determining orientation $\alpha_{user}$ of the body part of the user based on $X_{1,norm,shift}, Y_{1,norm,shift}, Z_{1,norm,shift}$, and determining $\alpha$ as a difference between $\alpha_{ref}$ and $\alpha_{user}$. Indeed, there is a transformation between 3D coordinates and 3D orientation.

If the desired orientation is not available, then the method can include (see operation 540) determining a difference $\alpha$ between orientation of the body part of the user and orientation of the corresponding body part of the reference user, based on position data obtained for the body part of the user and the corresponding body part of the reference user. For example, the following formula can be used:

$$\alpha = \arccos \frac{X_{1,norm,shift} \cdot X_{2,norm,shift} + Y_{1,norm,shift} \cdot Y_{2,norm,shift} + Z_{1,norm,shift} \cdot Z_{2,norm,shift}}{L_1 L_2}$$

In this formula, $L_1$ is the length of the body part (after normalization) of the user and $L_2$ is the length of the body part (after normalization) of the reference user. For example, we can use $L_1 = \sqrt{X_{1,norm,shift}^2 + Y_{1,norm,shift}^2 + Z_{1,norm,shift}^2}$ and $L_2 = \sqrt{X_{2,norm,shift}^2 + Y_{2,norm,shift}^2 + Z_{2,norm,shift}^2}$.

Figure 6:
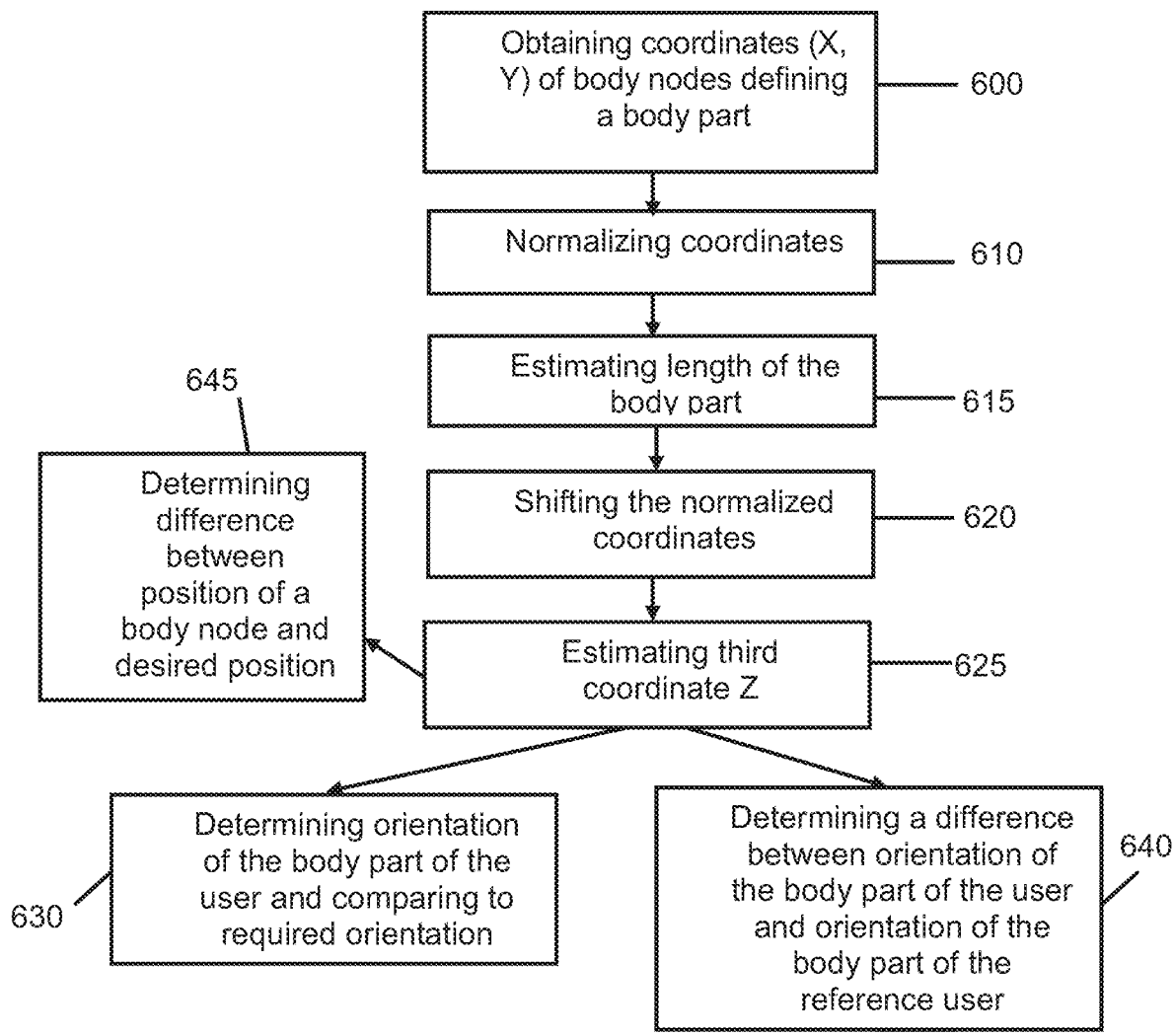
FIG. 6 illustrates a diagram of a method of comparing orientation or position of a body part/body node of a user with a desired orientation or position, when two dimensional position data is available.

Attention is now drawn to FIG. 6, which depicts a variant of the method of FIG. 5. In some embodiments, only two dimensional position data are available for the user and the reference user.

Assume that a body part is defined by a segment joining two body nodes (first body node corresponding to a first extremity of the body part, and second body node corresponding to a second extremity of the body part). Assume that position of each body node of the user is defined by two coordinates in the image (see reference 600). Assume that the second body node (second extremity of the body part of the user) has coordinates $X_1, Y_1$.

In some embodiments, the method can include normalizing (operation 610) the coordinates, to obtain normalized coordinates $X_{1,norm}, Y_{1,norm}$. This can be performed also for the first body node. This can include dividing the coordinates by the body height of the user. The same can apply to the reference user (to obtain $X_{2,norm}, Y_{2,norm}$). This operation is similar to operation 510.

The method can include estimating, for each body part, a length of the body part (operation 615).

In some cases, this estimation can be made directly from the image (for example if the body part of the user is orthogonal to the line of sight of the camera—this can be obtained e.g. by asking the user to stand straight in front of the camera for calibration purposes).

In most cases, body part is not orthogonal to the line of sight of the camera, and therefore appears shorter as it is in the image, and length of the body part can be estimated.

In some embodiments, the estimation can include determining, based on a model of human body proportion, length of each body part of interest. Assume for example that coordinates of the body nodes are normalized with respect to the body height of the user in each image, as explained above (therefore body height has a length equal to "1"). Then the model can indicate that lower leg has a length of ¼, lower arm has a length of ⅛, etc. This estimation can be used both for the user and for the reference user.

In some embodiments, the method can include shifting (operation 620) the normalized coordinates in another referential. In particular, the position of the second body node (second extremity of the body part) can be expressed in a referential affixed to the first body node (first extremity of the body part). The normalized shifted coordinates are $X_{1,norm,shift}, Y_{1,norm,shift}$. The same can apply to the reference user (to obtain $X_{2,norm,shift}, Y_{2,norm,shift}$).

The method can include estimating (operation 625) the third coordinate ($Z_{1,est}$) of the second body node. In some embodiments, the following formula can be used:

$$Z_{1,est} = \pm \sqrt{(L^2 - X_{1,norm,shift}^2 - Y_{1,norm,shift}^2)}$$

L is the length of the body part (after normalization). In some embodiments, it can be assumed that after normalization, L is the same both for the user and the reference user. This is not limitative and in some embodiments, an estimate can be performed separately for the user and the reference user e.g. using a calibration method). The same formula can be used for the reference user to obtain the third coordinate of the second body node $Z_{2,est}$.

Since only two dimensional position data is available, there is an uncertainty on the sign of $Z_{1,est}$ (resp. $Z_{2,est}$).

If position of a body node is to be compared with a desired position, then it is possible to compare ($X_{1,norm}, Y_{1,norm}, Z_{1,est}$) to ($X_{2,norm}, Y_{2,norm}, Z_{2,est}$) (see operation 645).

In some embodiments, based on these coordinates, it is possible to compute (operation 640) the difference a in orientation between the body part of the user and of the reference user.

Angle α, which defines the difference between the orientation of the body part of the user, and the body part of the reference user, can be computed as follows (it is assumed that L is the same for the user and the reference user, however, this is not limitative as mentioned above:

$$\alpha = \arccos \frac{X_{1,norm,shift} \cdot X_{2,norm,shift} + Y_{1,norm,shift} \cdot Y_{2,norm,shift} + Z_{1,est} \cdot Z_{2,est}}{L^2}$$

In some embodiments, since there is an uncertainty on the sign of $Z_1$ and $Z_2$, an optimistic scenario can be selected (which yields the smallest angle α). This is not mandatory.

If the desired orientation $\alpha_{ref}$ (3D orientation, defined by three angles) is available, then the method can include (see operation 630) determining orientation $\alpha_{user}$ of the body part of the user based on $X_{1,norm,shift}, Y_{1,norm,shift}, Z_{1,est}$, and determining α as the difference between $\alpha_{user}$ to $\alpha_{ref}$. As already mentioned above, there is transformation allowing converting 3D coordinates into a 3D angle, and conversely, which can be used herein.

In some embodiments, the matching criterion (as discussed e.g. in operations 330 and 430) is a function of angle α. For example, the comparison meets the matching criterion if cos α and/or $$1 - \frac{2\alpha}{\pi}$$

is above a threshold.

Figure 7:
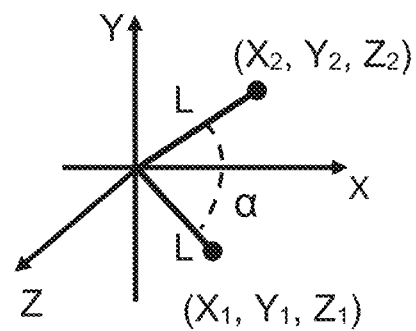
FIG. 7 illustrates an example of the method of FIG. 6.

A non-limitative example of the method of FIG. 6 is illustrated in FIG. 7, in which orientation of the right lower arm of the user 480 (as depicted in FIG. 4A) is compared to orientation of the right lower arm of the reference user 481 (as depicted in FIG. 4A). Angle α can be computed as explained above.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A method comprising, by a processor and memory circuitry:
   obtaining a first sequence of images of a user,
   determining correct performance of at least one pose of the user in the first sequence of images, the determination including:
   based on at least one image of the first sequence of images, for each body part of a plurality of body parts of the user, comparing at least one of spatial orientation and position of the body part of the user, or of at least one body node thereof, with at least one of desired spatial orientation and position, the comparing comprising:
   comparing the spatial orientation of the body part in a referential independent of an orientation of any other body part of the user, with
   the desired spatial orientation,
   if the comparison does not meet a matching criterion for at least one body part of the user, or of at least one body node thereof, outputting data representative of a mismatch between the at least one body part of the user, or of the at least one body node thereof, and the at least one of desired spatial orientation and position.

2. The method of claim 1, including:
   based on a plurality of images of the first sequence of images, for at least one body part of a plurality of body parts of the user, comparing at least one of spatial orientation and position of the body part or of at least one body node thereof in each image of the plurality of images with at least one of desired spatial orientation and position, and based on the comparison, outputting data representative of correct performance of a motion of the user over the plurality of images.

3. The method of claim 1, including comparing, for a group of body parts, at least one of spatial orientation and position of each body part of the user belonging to the group, or of at least one body node thereof, with at least one of desired spatial orientation and position, and based on the comparison, outputting data representative of correct performance of a pose defined by the group of body parts.

4. The method of claim 1, wherein the at least one of desired spatial orientation and position is a spatial orientation and position of a corresponding body part, or of at least one body node thereof, of a reference user or of the user himself.

5. The method of claim 1, wherein, responsive to determining of a mismatch between the at least one body part of the user, or of at least one body node thereof, and the at least one of desired spatial orientation and position, the method includes preventing from comparing at least one of spatial orientation and position of a given second body part of the user in the image, or of at least one body node thereof, with at least one of desired spatial orientation and position, wherein the given second body part is predefined with respect to the at least one body part, wherein the comparison is prevented until a stopping condition is met.

6. The method of claim 1, including providing a library including at least one of:
   a list of desired configurations of one or more groups of body parts, wherein each configuration can be expressed by at least one semantic expression,
   a list of desired motions, wherein each desired motion can be expressed by at least one semantic expression,
   wherein the library is usable for at least one of:
   providing instructions to the user,
   evaluating at least one of a configuration of a group of body parts and a motion of the user, and
   providing a semantic feedback to the user.

7. The method of claim 1, including:
   (1) comparing at least one of spatial orientation and position of a body part of the user, or of at least one body node thereof, with at least one of desired spatial orientation and position,
   (2) if the comparison meets a matching criterion, repeating (1) for a next body part of the user, wherein the next body part is selected according to data representative of human body kinematics.

8. The method of claim 7, wherein data representative of human body kinematics includes a representation of at least one of body nodes and body parts, wherein the representation is hierarchical and representative of connectivity between the at least one of body nodes and body parts in a human body.

9. The method of claim 7, further including:
   (3) if the comparison does not meet a matching criterion, preventing from comparing at least one of spatial orientation and position of a given next body part of the user in the image, or of at least one body node thereof, with at least one of desired spatial orientation and position, wherein the given next body part is selected based on the data representative of human body kinematics.

10. The method of claim 1, including:
    determining a pose of the user in each of one or more images of the first sequence of images,
    providing at least one of:
    data representative of a time delay between a pose of the user in an image at a first time, and a desired pose expected at a second time;
    data representative of differences between an order of poses of the user and a desired order of poses; and
    data representative of differences between a plurality of poses of the user and a plurality of desired poses.

11. The method of claim 1, including normalizing position data representative of the body part or of a body node thereof of the user based on a height of the user.

12. A system including a processor and memory circuitry configured to:
    obtain a first sequence of images of a user,
    determine correct performance of at least one pose of the user in the first sequence of images, the determination including:
    based on at least one image of the first sequence of images, for each body part of a plurality of body parts of the user, comparing at least one of spatial orientation and position of the body part of the user, or of at least one body node thereof, with at least one of desired spatial orientation and position, the comparing comprising:
    comparing the spatial orientation of the body part in a referential independent of an orientation of any other body part of the user, with
    the desired spatial orientation,
    if the comparison does not meet a matching criterion for at least one body part of the user, or of at least one body node thereof, outputting data representative of a mismatch between the at least one body part of the user, or of the at least one body node thereof, and the desired spatial orientation and position.

13. The system of claim 12, configured to:
    based on a plurality of images of the first sequence of images, for at least one body part of a plurality of body parts of the user, compare at least one of spatial orientation and position of the body part or of at least one body node thereof in each image of the plurality of images with at least one of desired spatial orientation and position, and
    based on the comparison, output data representative of correct performance of a motion of the user over the plurality of images.

14. The system of claim 12, configured to compare, for a group of body parts, at least one of spatial orientation and position of each body part of the user belonging to the group, or of at least one body node thereof, with at least one of desired spatial orientation and position, and based on the comparison, output data representative of correct performance of a pose defined by the group of body parts.

15. The system of claim 12, wherein, responsive to determining of a mismatch between the at least one body part of the user, or of at least one body node thereof, and the at least one of desired spatial orientation and position, the system is configured to prevent from comparing at least one of spatial orientation and position of a given second body part of the user in the image, or of at least one body node thereof, with at least one of desired spatial orientation and position, wherein the given second body part is predefined with respect to the at least one body part.

16. The system of claim 12, configured to:
(1) compare at least one of spatial orientation and position of a body part of the user, or of at least one body node thereof, with at least one of desired spatial orientation and position,
(2) if the comparison meets a matching criterion, repeat (1) for a next body part of the user, wherein the next body part is selected according to data representative of human body kinematics.

17. The system of claim 16, wherein data representative of human body kinematics includes a representation of at least one of body nodes and body parts, wherein the representation is hierarchical and representative of connectivity between the at least one of body nodes and body parts in the human body.

18. The system of claim 16, further configured to:
(3) if the comparison does not meet a matching criterion, prevent from comparing at least one of spatial orientation and position of a given next body part of the user in the image, or of at least one body node thereof, with at least one of desired spatial orientation and position, wherein the given next body part is selected based on the data representative of human body kinematics.

19. The system of claim 12, configured to:
determine a pose of the user in each of one or more images of the first sequence of images,
provide at least one of:
data representative of a time delay between a pose of the user in an image at a first time, and a desired pose expected at a second time;
data representative of differences between an order of poses of the user and a desired order of poses; and
data representative of differences between a plurality of poses of the user and a plurality of desired poses.

20. A non-transitory computer readable medium comprising instructions that, when executed by a processor and memory circuitry (PMC), cause the PMC to perform operations comprising:
obtaining a first sequence of images of a user,
determining correct performance of at least one pose of the user in the first sequence of images, the determination including:
based on at least one image of the first sequence of images, for each body part of a plurality of body parts of the user, comparing at least one of spatial orientation and position of the body part of the user, or of at least one body node thereof, with at least one of desired spatial orientation and position, the comparing comprising:
comparing the spatial orientation of the body part in a referential independent of an orientation of any other body part of the user, with
the desired spatial orientation,
if the comparison does not meet a matching criterion for at least one body part of the user, or of at least one body node thereof, outputting data representative of a mismatch between the at least one body part of the user, or of the at least one body node thereof, and the at least one of desired spatial orientation and position.

* * * * *